United States Patent [19]

Katz

[11] Patent Number: 4,831,550
[45] Date of Patent: May 16, 1989

[54] APPARATUS AND METHOD FOR ESTIMATING, FROM SPARSE DATA, THE PROBABILITY THAT A PARTICULAR ONE OF A SET OF EVENTS IS THE NEXT EVENT IN A STRING OF EVENTS

[75] Inventor: Slava M. Katz, Westport, Conn.

[73] Assignee: International Business Machines Corporation, Armonk, N.Y.

[21] Appl. No.: 844,904

[22] Filed: Mar. 27, 1986

[51] Int. Cl.$^4$ .............................................. G10L 1/00
[52] U.S. Cl. .................................. 364/513.5; 381/43
[58] Field of Search ...................... 381/43; 364/513.5

[56] References Cited

U.S. PATENT DOCUMENTS

| | | | |
|---|---|---|---|
| 3,188,609 | 6/1965 | Harmon et al. | 340/146.1 |
| 3,925,761 | 12/1975 | Chaires et al. | 381/43 |
| 3,969,700 | 7/1976 | Bollinger et al. | 381/43 |
| 4,038,503 | 7/1977 | Moshier | 179/1 SA |
| 4,156,868 | 5/1979 | Levinson | 381/43 |
| 4,277,644 | 7/1981 | Levinson et al. | 381/43 |
| 4,400,788 | 8/1983 | Myers et al. | 381/43 |
| 4,435,617 | 3/1984 | Griggs | 381/43 |
| 4,489,435 | 12/1984 | Moshier | 381/43 |
| 4,530,110 | 7/1975 | Nojiri et al. | 381/43 |
| 4,538,234 | 8/1985 | Honda | 364/513 |

OTHER PUBLICATIONS

Interpolation of Estimators Derived from Sparse Data, L. R. Bahl et al., IBM Technical Disclosure Bulletin, vol. 24 No. 4, Sep. 1981.
Variable N-Gram Method for Statistical Language Processing, F. J. Damerau, IBM Technical Disclosure Bulletin, vol. 24 No. 11A, Apr. 1982.
Probability Distribution Estimation from Sparse Data, F. Jelinek et al., IBM Technical Disclosure Bulletin, vol. 28 No. 6, Nov. 1985.
Recursive Self-Smoothing of Linguistic Contingency Tables, A. J., Nadas, IBM Technical Disclosure Bulletin, vol. 27 No. 7B, Dec. 1984.
Proceedings of the IEEE, vol. 73, No. 11, Nov. 1985, pp. 1616-1624 F. Jelinek: "The Development of an Experimental Discrete Dictation Recognizer".

Primary Examiner—Gary V. Harkcom
Assistant Examiner—Christopher H. Lynt
Attorney, Agent, or Firm—Marc D. Schechter

[57] ABSTRACT

Apparatus and method for evaluating the likelihood of an event (such as a word) following a string of known events, based on event sequence counts derived from sparse sample data. Event sequences—or m-grams—include a key and a subsequent event. For each m-gram is stored a discounted probability generated by applying modified Turing's estimate, for example, to a count-based probability. For a key occurring in the sample data there is stored a normalization constant which preferably (a) adjusts the discounted probabilities for multiple counting, if any, and (b) includes a freed probability mass allocated to m-grams which do not occur in the sample data. To determine the likelihood of a selected event following a string of known events, a "backing off" scheme is employed in which successively shorter keys (of known events) followed by the selected event (representing m-grams) are searched until an m-gram is found having a discounted probability stored therefor. The normalization constants of the longer searched keys—for which the corresponding m-grams have no stored discounted probability—are combined together with the found discounted probability to produce the likelihood of the selected event being next.

14 Claims, 8 Drawing Sheets

TRIGRAM DISCOUNTS $d^{(3)}$

| COUNT | 1 | 2 | 3 | 4 | 5 | --- | 8 |
|---|---|---|---|---|---|---|---|
| DISCOUNT FACTOR | .50 | .65 | .75 | .90 | 1.00 | --- | 1.00 |

FIG.6

BIGRAM DISCOUNTS $d^{(2)}$

| COUNT | 1 | 2 | 3 | 4 | 5 | --- | 10 | --- | 13 |
|---|---|---|---|---|---|---|---|---|---|
| DISCOUNT FACTOR | .65 | .75 | .80 | .95 | 1.00 | --- | 1.00 | --- | 1.00 |

FIG.7

TRIGRAMS WITH A KEY $W_1$ $W_2$ (KEY COUNT 12)

| 1 | 2 | 3 | 4 | 5 |
|---|---|---|---|---|
| WORD $W_3$ | COUNT | COUNT-BASED PROBABILITY | DISCOUNTED PROBABILITY | CONTRIBUTION |
| $W_A$ | 8 | 0.667 | 0.667 | 0 |
| $W_B$ | 3 | 0.250 | 0.188 | 0.062 |
| $W_C$ | 1 | 0.083 | 0.042 | 0.042 |
|  | 12 | 1.000 | 0.896 | 0.104 |

FIG.10

BIGRAMS WITH A KEY $W_2$ (KEY COUNT 32)

| 1 | 2 | 3 | 4 | 5 |
|---|---|---|---|---|
| WORD $W_3$ | COUNT | COUNT-BASED PROBABILITY | DISCOUNTED PROBABILITY | CONTRIBUTION |
| $W_A$ | 13 | 0.406 | 0.406 | 0 |
| $W_B$ | 10 | 0.312 | 0.312 | 0 |
| $W_C$ | 4 | 0.125 | 0.119 | 0.006 |
| $W_D$ | 2 | 0.062 | 0.047 | 0.016 |
| $W_E$ | 1 | 0.031 | 0.020 | 0.011 |
| $W_F$ | 1 | 0.031 | 0.020 | 0.011 |
| $W_G$ | 1 | 0.031 | 0.020 | 0.011 |
|  | 32 | 1.000 | 0.945 | 0.055 |

APPARATUS AND METHOD FOR ESTIMATING, FROM SPARSE DATA, THE PROBABILITY THAT A PARTICULAR ONE OF A SET OF EVENTS IS THE NEXT EVENT IN A STRING OF EVENTS

I. FIELD OF THE INVENTION

The present invention relates generally to the art of estimating, from sparse sample data, the probability that a particular one of a set of events is the next event in a string of events. A particular embodiment of the invention involves estimating the probability that a word from a vocabulary of words is the next word in a string, given sparse word sequence sample data.

II. BACKGROUND OF THE INVENTION

In various environments, a string of events may be known and a prediction of the next event is sought. For example, in a speech recognition environment, a string of words may be known and it is a prediction of the next word that is sought.

One approach to determining the next word is to store, for each word in the vocabulary, a respective probability of being next based on frequency of occurrence. That is, a sample text is examined and the number of times each predefined sequence of words occurs in the sample text is counted. From the count for a given predefined sequence, a corresponding probability is readily computed. While this approach is useful where there is a small vocabulary of words and an extensive sample text covering the numerous predefined sequences, the approach is inadequate where data is sparse relative to the size of the vocabulary.

In speech recognition systems which compute next word probability estimates, the available data is typically sparse. In this regard, it is observed that even a very large data collection will normally not include sufficient data from which the probabilities of infrequent word sequences—which may occur rarely or not at all—may be estimated. Hence, there is insufficient data to account for all possible next words.

The problem of sparse data is explained in the context of m-grams. An m-gram is a sequence of m events (in the present case, words). A sample text is examined to determine how often each m-gram occurs therein. An m-gram, it is noted, may be one word, two words, ..., or j words long. The larger the value for j, the more possible combinations of words there are. For a vocabulary of 5000 words, there would be $5000^2 = 25$ million two word combinations (referred to as bi-grams). Also for 5000 words, there are $5000^3 = 125$ billion three word combinations (referred to as tri-grams).

It is readily observed that the sample text required to permit each tri-gram to occur just once is impractically large. Moreover, in that different events must occur at different frequencies if the statistics are to be useful, the sample text must be considerably greater than $5000^3$. In addition, if the vocabulary is to be greater than 5000— for example, 20,000—the problem of sparse data is even more pronounced.

To address the paucity of data, some prior techniques have linearly summed or combined the respective relative frequencies $f_L$ of m-grams of differing length L for a subject word to estimate the probability of the subject word being the next word. That is, to estimate the probability of word $w_j$ following the ordered string of previous known words $w_1, w_2, \ldots, w_{j-1}$ the following expression has been suggested:

$$\text{Prob}(w_j | w_1, \ldots, w_{j-1}) = af_1(w_j) + bf_2(w_j | w_{j-1}) + cf_3(w_j | w_{j-2}, w_{j-1}) + \ldots$$

where a, b, and c represent weighting factors which may be included. When probabilities of m-grams of varying length are linearly combined, the relative weight or importance of each must be evaluated, a task which has been found to be difficult to achieve.

Prior art which addresses the sparse data problem includes U.S. Pat. Nos. 4,538,234, 4,038,503, 4,489,435, 4,530,110 and the following Articles: *IBM Technical Disclosure Bulletin*, vol. 27, number 7b pp. 4521-3 (Nadas); *IBM Technical Disclosure Bulletin*, vol. 24, Number 11A pp. 5402-3 (Damerau); *IBM Technical Disclosure Bulletin*, vol. 24, Number 4 pp. 2038-41 (Bahl et al.); and *IBM Technical Disclosure Bulletin*, vol. 28, Number 6 pp. 2591-4 (Jelinek at el.).

III. SUMMARY OF THE INVENTION

The present invention addresses the problem of sparse data in estimating next event probabilities without linearly combining the counts or probabilities of multiple m-grams which include a subject event. Instead, the present invention employs a "back off" method which starts with the longest m-gram for which a count may be stored and analyzes m-grams of successively shorter length only if no m-gram of longer length has a count or a probability derived from a count associated therewith.

In a speech recognition environment, the m-grams represent ordered sequences of m words. And it is the next word in a string of words that is to be predicted from word m-grams stored for a language model. That is, the invention determines the probability that a selected vocabulary word is the jth word in a string of j words given that the previous (j−1) words are known and given that m-grams of length j, (j−1), ..., 2 that end with the selected word may or may not have occurred in the sample text.

For each of some m-grams of length j, there is a respective frequency of occurrence in the sample text and a respective "count-based" probability corresponding to the frequency of occurrence. The count-based probabilities are discounted by respective predefined factors.

To account for m-grams of length j which do not occur in the sample text but which are possible, the discounted probabilities are summed. The sum of discounted probabilities is less than one, the difference therebetween representing a "free probability mass" FM1 that is reversed fro the non-occurring m-grams of length j.

In accordance with the invention, an m-gram of length j which has a small count is considered "suspect" and provides a relatively high "contribution" to the freed probability mass FM1. Contrarily, an m-gram having a relatively large count may have a small or even zero contribution.

In determining the likelihood of a selected word being the next word, the selected word is concatenated onto (j−1) previous known words to form a subject m-gram of length j. If the subject m-gram of length j has occurred during the sample text and a discounted probability therefor has been stored, the discounted probability is used to represent the likelihood of the selected (subject) word being the next word.

In the event that the subject m-gram of length j does not have a count based on the sample text, an analysis proceeds with m-grams of length (j−1). In particular, the free probability mass FM1 is distributed among the m-grams of length (j−1). That is, based on the respective count for each m-gram of length (j−1) that occurs in the sample text, a respective count-based probability is stored. In this regard, when a sequence occurrence is tallied in an m-gram count, subsequence occurrences are not tallied for counts of lesser-included m-grams. That is, a series of events counted in a greater-included m-gram are not counted again in any (shorter) lesser-included m-gram. For example, if occurrences of the word sequence $w_1$, $w_2$, $w_3$ are accounted for in a trigram distribution for a key $w_1$, $w_2$, the counts for the bi-gram $w_2$, $w_3$ are not counted in a bi-gram distribution for the key $w_2$.

As with the m-grams of length j, the count-based probabilities for m-grams of length (j−1) are also discounted to again provide a freed probability mass FM2. FM2 is then allocated to m-grams of length (J−1) which do not occur in the sample text.

It is then determined if the m-gram of length (j−1)—which includes the (j−2) previous known words followed by the selected word—has a respective discounted probability associated therewith. If so, the discounted probability is applied to the freed probability mass FM1 to provide the likelihood of the selected word being the next word.

If the m-gram of length (j−1) that includes the selected word has not occurred during the sample text and hence has no discounted probability, the freed probability mass FM2 is distributed among the m-grams of length (j−2).

The analysis proceeds recursively, "backing off" to successively shorter m-grams until an m-gram length is reached at which an m-gram including the selected (subject) word has a discounted probability associated therewith. At that point, a probability is computed based on the freed probability masses resulting from all earlier m-gram analyses and the stored discounted probability.

The present invention estimates the likelihood that a subject word is the next word, without the need for determining weighting factors in a linear expression. Moreover, since discounted probability and normalization constants are precomputed, the processing time for computing next word probability estimates is small.

Typically, the language model of the specific embodiment is used in a speech recognition system in conjunction with an acoustic match component and a decoder. Based on scores generated by the acoustic match component and the language model component, the decoder determines which word paths are sufficiently likely as to warrant further extension. In such an environment, a language model component is particularly useful in evaluating the respective likelihood of homonyms and the like.

A speech recognition system with a language model component constructed according to the present invention has achieved high recognition accuracy rates on the order of 97% in conjunction with an acoustic match component and a stack decoder.

V. DESCRIPTION OF THE INVENTION

A. General Description

Figure 1:
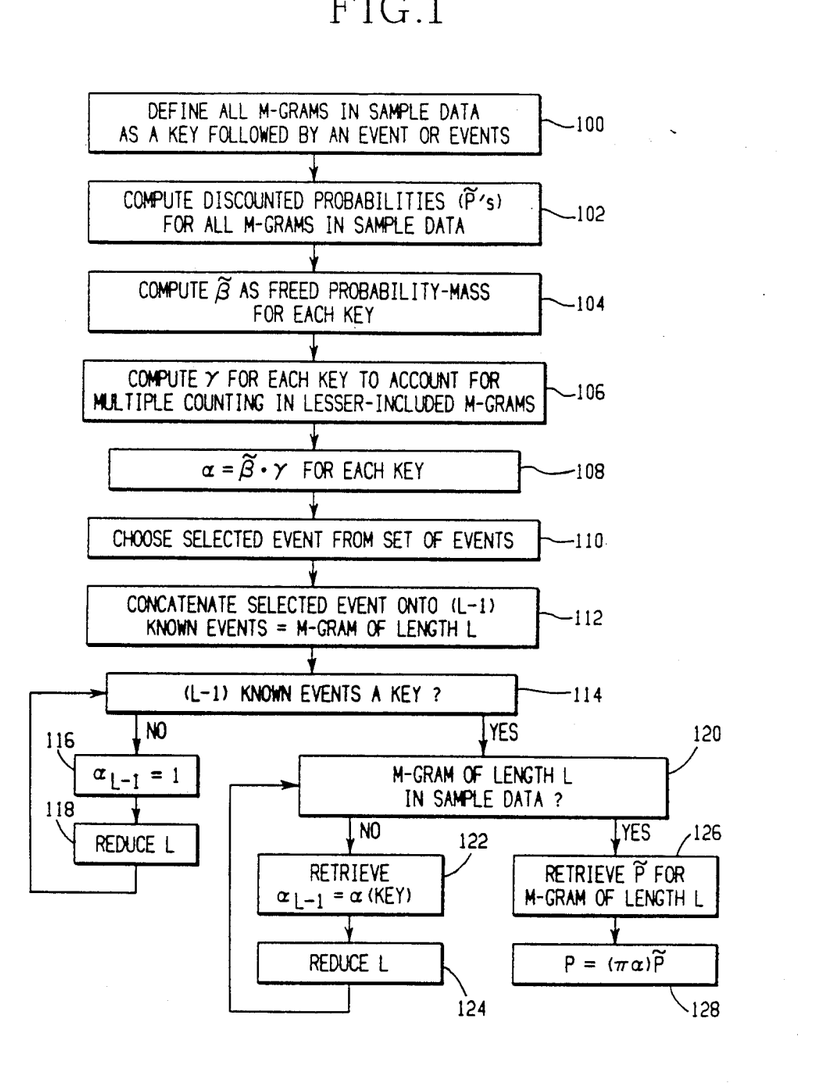
FIG. 1 is a diagram illustrating steps performed in accordance with a general implementation of the invention.

Referring to FIG. 1, general methodology of the present invention is set forth. In accordance with the invention, "m-grams" which occur in a sample text are characterized as a "key" followed by an event (or events). An "m-gram" is a specific sequence of m events, where m is greater than or equal to one. A "key" is a subsequence of events in an m-gram, where the events in the subsequence have been previously decoded or are otherwise known. The defining of all m-grams—occurring in the sample data—as a key followed by an event (or events) is performed in step 100. In this regard, it is preferable that each m-gram include a key of (m−1) events followed by one event.

In step 102, each m-gram occurring in the sample data has a discounted probability $\tilde{P}$ computed therefor which is stored. As noted hereinbelow, a method of determining the value of $\tilde{P}$ for a given m-gram is to use modified Turing's estimate on a maximum likelihood probability that is based on relative frequency of occurrence.

In step 104, a freed probability mass is defined for each key. The determination of the freed probability mass is discussed hereinbelow. In brief, for a specific key of (m−1) events, there are a plurality of mth events that have occurred with corresponding counts in the sample data. Count-based probabilities for the plurality of occurring mth events are discounted and summed, the total being subtracted from 1.0 to provide $\tilde{\beta}$, a "freed probability mass". A free probability mass is that portion of the m-gram probability distribution which is allocated to m-grams which could have but did not occur in the sample data. According to the invention, count-based probabilities "contribute" to $\tilde{\beta}$ based on their respective frequencies of occurrence in the sample data. Low count-based probabilities are considered "suspect" and contribute substantially more than high count-based probabilities.

In addition to the $\tilde{\beta}$ computed for each key, there is also a factor $\gamma$ computed for each key at step 106. It is noted that some m-grams are lesser-included m-grams. For example, an m-gram of events $w_2$, $w_3$ is a lesser-included m-gram of $w_1, w_2, w_3$. Each occurrence of the m-gram $w_1, w_2, w_3$ in the sample data also results in the occurrence of the m-gram $w_2, w_3$. It is important that a count only be tallied for the longest m-gram and not the lesser-included m-grams. The factor $\gamma$ is thus computed to account for such multiple counting.

A normalization constant for each key is determined in step 108 as $\alpha(\text{key}) = \tilde{\beta}\gamma$.

Preferably, the discounted probabilities $\tilde{P}$ and the normalization constants $\alpha$ are pre-computed and stored. Real-time processing then proceeds as follows.

One event from a set of events is selected (step 110). The selected event is concatenated onto a string of $(L-1)$ previous events which are known. The previous known events may be the result of previous iterations of a next event predictor system. The concatenated events form an m-gram of length L (see step 112).

A decision is made in step 114 as to whether the $(L-1)$ known events represent a key (that has occurred in the sample data). If not, a normalization constant $\alpha_{L-1}$ is assigned the value 1 at step 116 and the value for L is reduced at step 118. Preferably, the value of L is decremented by 1. (If decrementing is by some other value, a check for $L \leq 0$ may be required.) After L is reduced, a new decision as to whether the $(L-1)$ events—with the new value for L—represent a key which has occurred in the sample data (see step 114) and is stored.

When the $(L-1)$ events represent a stored key, another decision is made at step 120. Has the m-gram of length L—which includes the key and the selected event—occurred in the sample data? If not, in step 122 the value for $\alpha_{L-1}$ is set to $\alpha(\text{key})$ which has been pre-computed and stored for the key in step 108. L is reduced in step 124 and step 120 is again performed.

If the m-gram of length L has occurred in the sample data, a pre-computed discounted probability $\tilde{P}$ (see step 102) is in storage. A probability estimate that the selected word is the next word after the key is determined by the expression $$P = \left( \pi_L \alpha_L \right) \tilde{P}.$$

That is, the probability estimate is the product of all previously generated $\alpha$'s (in steps 116 and 122) multiplied by the discounted probability $\tilde{P}$. This computation is performed in step 128.

It is noted that the probability estimate may also be characterized as the estimated probability of a particular m-gram, or sequence of m events, given the first $(m-1)$ events. Moreover, by repeating steps 110 through 128 for each event in the set, the events in the set may be ordered according to their respective likelihoods as the next event. Similarly, the most likely event (or event sequence) may be determined as well.

Furthermore, by storing logarithmic values for $\alpha$ and $\tilde{P}$, a logarithmic value for P may be computed by simply adding the log $\alpha$ values with the log $\tilde{P}$ value.

Figure 2:
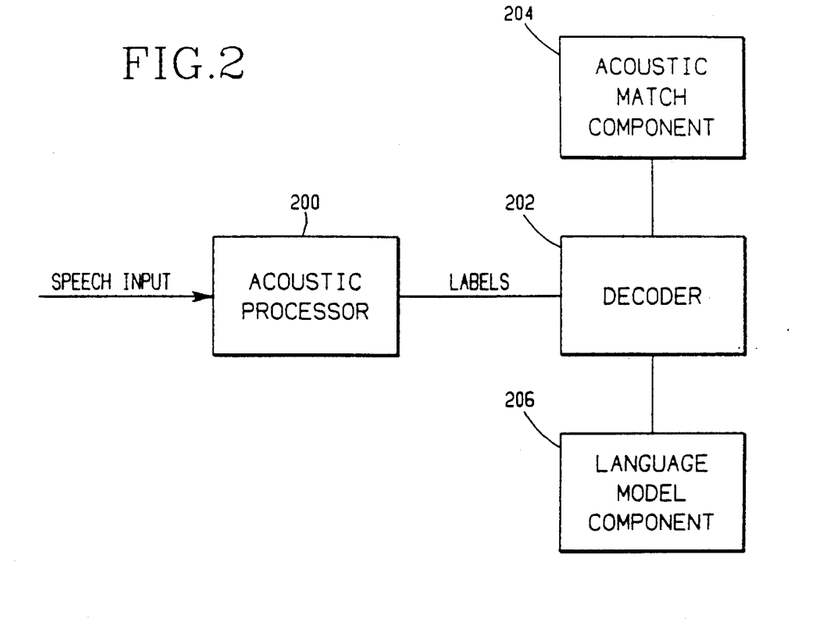
FIG. 2 is a block diagram showing a preferred environment for the present invention.

A specific speech recognition environment for the invention is shown in FIG. 2. Speech input is shown entering an acoustic processor 200 which converts acoustic waveforms into a string of labels. Each label is selected from an alphabet of approximately 200 labels and corresponds to a prototype vector which represents a respective sound type. The string of labels is directed by a decoder 202 to an acoustic match component 204.

The acoustic match component 204 uses the string of labels to determine relative likelihoods for words in a vocabulary based on acoustic criteria. That is, the acoustic match component 204 provides a list of vocabulary words likely to correspond to the generated labels. Acoustic matching is discussed in a patent application filed on even date herewith, entitled "Speech Recognition System," invented by L. R. Bahl, S. V. de Gennaro, P. V. de Souza, and R. L. Mercer (now U.S. Pat. No. 4,718,094).

Based on acoustics only, the acoustic match component 204 does not evaluate word context. Homonyms or similarly sounding phrases may be troublesome to the acoustic match component 204. The language model component 206 is preferably included to work in conjunction with the acoustic match component 204 in providing word likelihood information to the decoder 202. The decoder 202 selects one or more likely paths of words to which likely next words—determined from data generated by the acoustic match component 204 and the language model component 206—are to be added. Decoders have been described in general in the literature. A particularly effective stack decoder has been described in a co-pending patent application, U.S. Ser. No. 06/738,911, entitled "Apparatus and Method for Determining a Likely Word Sequence from Labels Generated by an Acoustic Processor" (now U.S. Pat. No. 4,748,670). This cited patent application (as well as other patent applications and patents cited herein) are incorporated by reference to the extent necessary to support the present disclosure.

Figure 3:
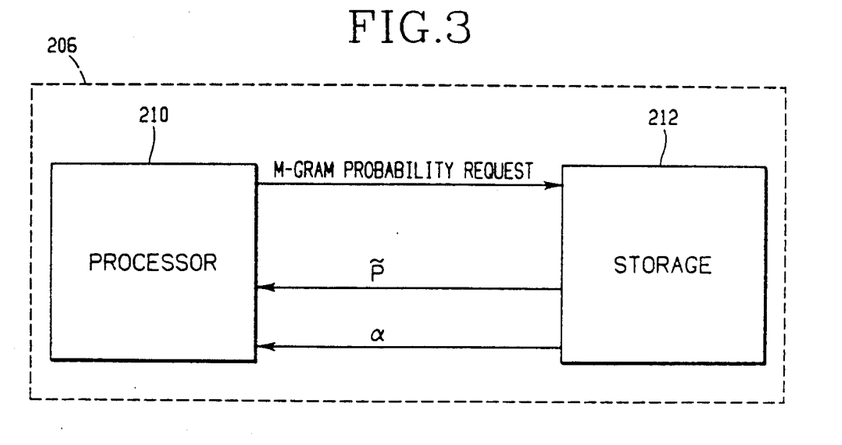
FIG. 3 is a block diagram showing major elements of invention apparatus.

One embodiment of the present invention is directed to the language model component 206. The language model component 206 is preferably formed of a processor 210 and memory storage 212 in FIG. 3. In FIG. 3, the processor 210 communicates requests to storage 212 for m-gram discounted probability values $\tilde{P}$. If the requested $\tilde{P}$ is stored, storage 212 sends $\tilde{P}$ to the processor 210. If the requested $\tilde{P}$ is not stored, an $\alpha$ is communicated to the processor 210.

Figure 4:
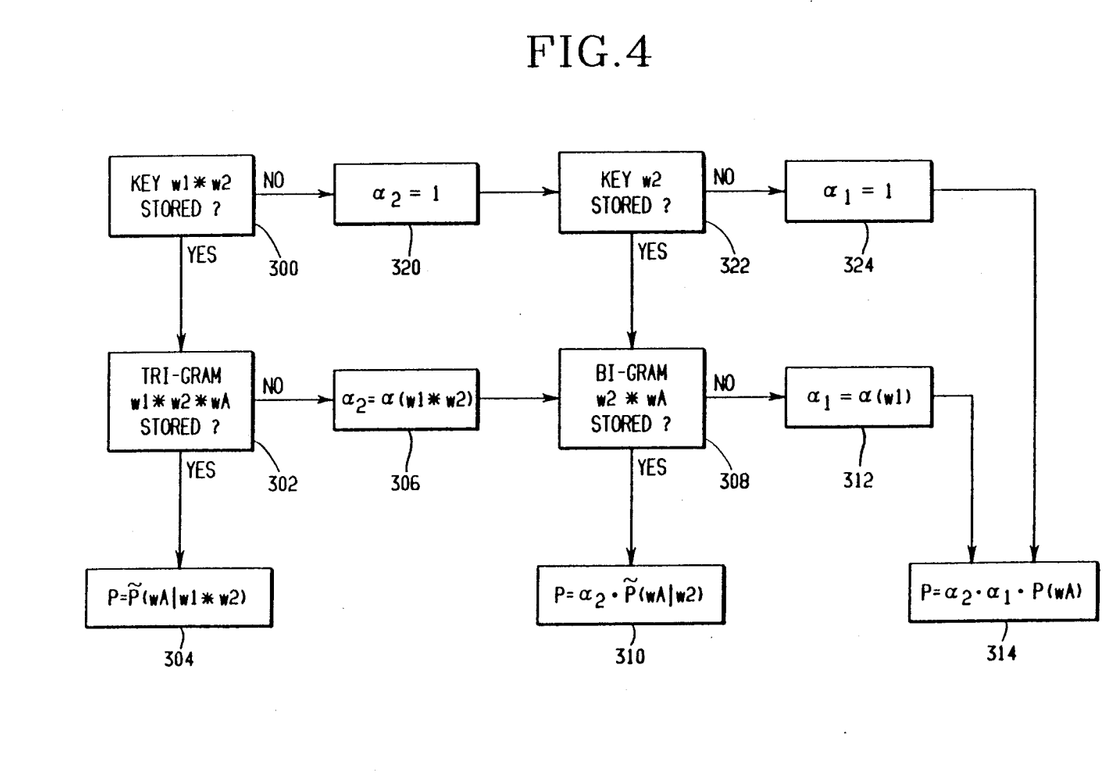
FIG. 4 is a chart illustrating the sequence of steps of one embodiment of the invention.

The operation of the language model component 206 is now discussed with reference to FIG. 4. FIG. 4 is limited to tri-grams, bi-grams, and uni-grams—i.e. m-grams of length 3, 2, and 1 respectively. In the embodiment of FIG. 4, the events are words, each word being represented by "w" with an identifier suffix or subscript. Each such word is included in a vocabulary list in storage (e.g. a section allocated in storage 212). Both the acoustic match component 204 and the language model component 206 typically limit processing to stored words in the vocabulary.

A string of words is represented by $w_1, w_2, w_3$. For a given key of two words, $w_1, w_2$, a plurality of tri-grams occurring in the text may be represented by $w_1, w_2, w_A$, $w_1, w_2, w_B$, $w_1, w_2, w_C$, and so on. In FIG. 4, it is presumed that words $w_1, w_2$ have been decoded and that the probability of a selected vocabulary word being next is sought.

In step 300, a check is made as to whether the key $w_1, w_2$ corresponds to a sequence occurring in a sample text. A sample text size used with the invention has included approximately 25 million words. Preferably, the sample text has been examined in advance to determine how often tri-grams, bi-grams, and uni-grams have occurred in the sample text. Given a vocabulary fixed in size at, for example 5000, 10,000, or 20,000 words, it is observed that some three-word sequence may include words not in the vocabulary and that some tri-grams of vocabulary words may never occur in the sample text.

To determine the likelihood of a word $w_A$ being the next word after a decoded sequence $w_1, w_2$, key $w_1, w_2$ is looked up in storage. If the key $w_1, w_2$ has occurred in the sample text and has an entry in storage, a decision is made at step 302 as to whether a particular tri-gram starting with the key and ending with the selected word $w_A$ has occurred. If yes, the probability that the next word after $w_1, w_2$ is $w_A$ is set equal to the stored discounted probability $\tilde{P}(w_A|w_1,w_2)$ in step 304. The $\tilde{P}$ discounted probability, as explained in greater detail hereinbelow, is pre-computed by (a) determining a probability based on the number of counts (i.e. the relative frequency of occurrence) of the m-gram, such probability being a count-based probability which is normally a maximum likelihood probability; (b) defining a discount factor for each m-gram occurring in the sample text; and (c) multiplying the count-based probability by the discount factor, the product being $\tilde{P}$. The discount factors may be computed by various methods, the use of modified Turing's estimate being described hereinbelow.

If, in step 302, it is found that the tri-gram $w_1, w_2, w_A$ has no stored discounted probability, a normalization constant $\alpha_2$ is set equal to a pre-computed stored value $\alpha(w_1, w_2)$ in step 306. After step 306, a decision is then made at step 308 as to whether the bi-gram $w_2, w_A$ has a stored entry corresponding thereto. If so, the probability estimate for $w_A$ being the next word is set equal to $P = \alpha_2 \tilde{P}(w_A|w_2)$ in step 310. If not, an $\alpha_1$ value is retrieved from storage in step 312. The likelihood of $w_A$ being the next word in this case is set equal to $P = \alpha_2 \alpha_1 P(w_A)$ (step 314). It is noted that $P(w_A)$ is not a discounted value because $w_A$ is at the uni-gram level; there is no lower level of m-gram. No freed probability mass need be generated at the uni-gram level; hence discounting is not required.

Returning to step 300, it is possible that the key $w_1, w_2$ did not occur in the sample text and hence there is no entry therefor in storage. In that event, $\alpha_2$ is set equal to 1 at step 320 and a check $w_2$ is made at step 322 to determine if a key corresponding to $w_2$ alone has been stored. If key $w_2$ is stored, step 308 et seq. are followed. If not, the value of $\alpha_1$ is set to 1 in step 324 and step 314 is performed.

Figure 5:
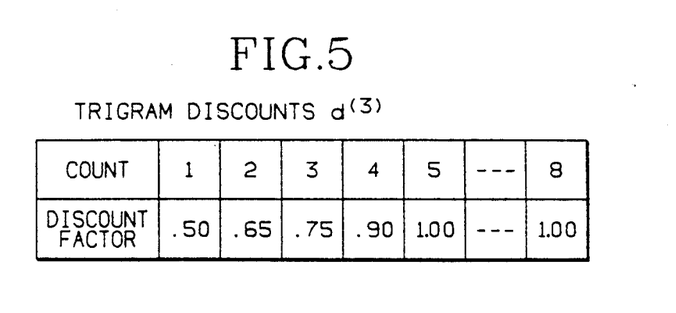
FIG. 5 and FIG. 6 are tables which store discounts assigned to tri-grams and bi-grams, respectively, shown as a function of count.
Figure 6:
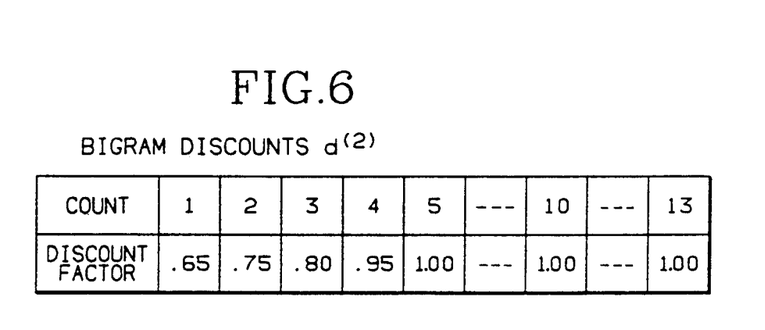

The operation of the speech recognition embodiment set forth in FIG. 4 is now explained with sample data set forth in FIG. 5 through FIG. 12. In FIG. 5, tri-gram discounts are listed. It is noted that the discount factor increases with increasing count (or frequency of occurrence) for tri-grams. That is, the higher the count, the closer the discounted probability is to the count-based probability. For tri-grams occurring once in the sample text, the count-based probability is multiplied by 0.50. For tri-grams occurring four times, the discounted probability is 0.90 the value of the count-based probability. (If the count is high enough, the invention contemplates a 1.00 discount factor so that the "discounted probability" equals the count-based probability.) FIG. 6 shows a similar discount table for bi-grams. A particular method of pre-computing the discounts is set forth in section B hereinbelow, the discounts being determined based on modified Turing's estimates.

Figure 7:
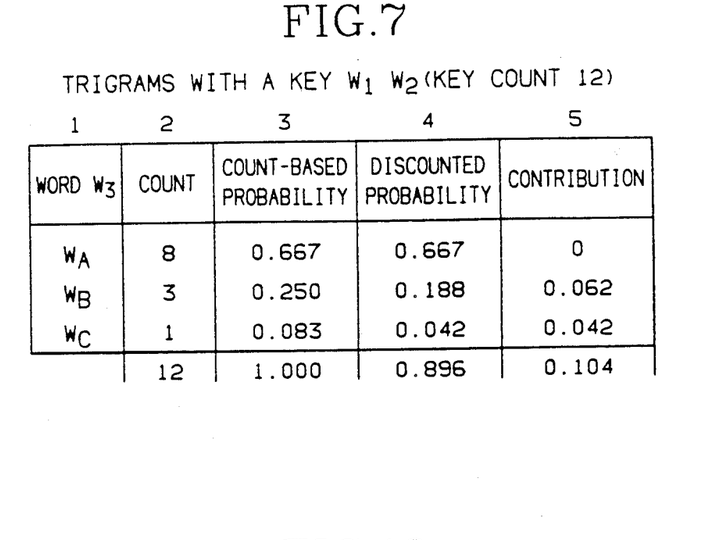
FIG. 7 is a table showing data stored for a particular tri-gram key.

Referring next to FIG. 7, a storage table is shown which includes an entry line for each word $w_A, w_B$, and $w_C$ which can follow a key $w_1, w_2$ which occurs in the sample text. The total number of counts for the key $w_1, w_2$ is 12, with $w_A$ (as the next word) accounting for 8 occurrences, $w_B$ accounting for 3, and $w_C$ accounting for 1. The respective count-based probabilities are thus 0.667, 0.250, and 0.083. For $w_A$, the count-based probability 0.667 is multiplied by 1.00 to yield a discounted probability of 0.667. For $w_B$, 0.250 is multiplied by 0.75 (see the discount factor for a tri-gram having three counts in FIG. 5) yielding 0.188. Similarly, $w_C$, is discounted to 0.042. By summing the discounted probabilities and subtracting from 1.00, a difference of 0.104 results. (This step is the same as summing individual "contributions" of m-grams subjected to discounting.) This computed value represents the freed probability mass FM1 for the key $w_1, w_2$.

In accordance with the invention, the above-computed value, referred to as $\tilde{\beta}$, is that portion of the probability distribution for tri-grams starting with $w_1, w_2$ which is allocated to all of the tri-grams starting with $w_1, w_2$ and ending with any word other than $w_A, w_B$, or $w_C$. In a 5000 word vocabulary, then, the 0.104 portion of the distribution is to be allocated to the 4997 words that do not occur in the sample text.

Figure 8:
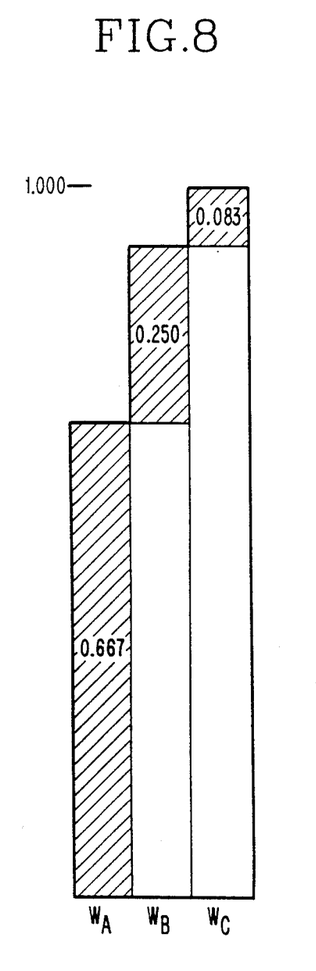
FIG. 8 and FIG. 9 are cumulative graphs, FIG. 8 showing count-based probabilities and FIG. 9 showing discounted probabilities for tri-grams.
Figure 9:
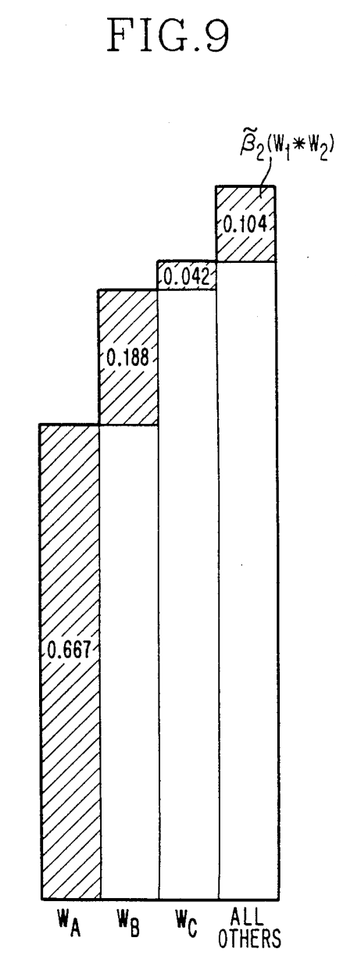

FIG. 8 and FIG. 9 show the cumulative probability of the count-based probabilities and of the discounted probabilities, respectively. The last column in the graph of FIG. 9 shows the 0.104 freed probability mass FM1 that remains after discounting. The value is specified as $\tilde{\beta}_2(w_1, w_2)$.

Figure 10:
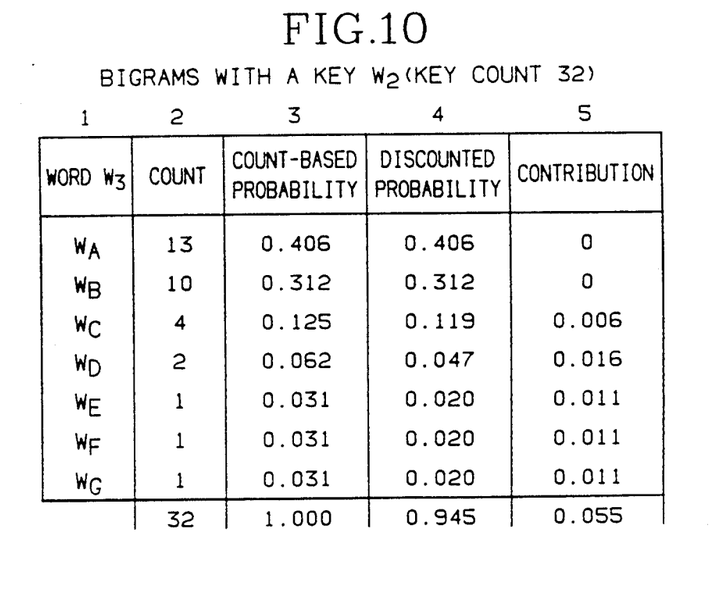
FIG. 10 is a table showing data for a particular bi-gram key.
Figure 11:
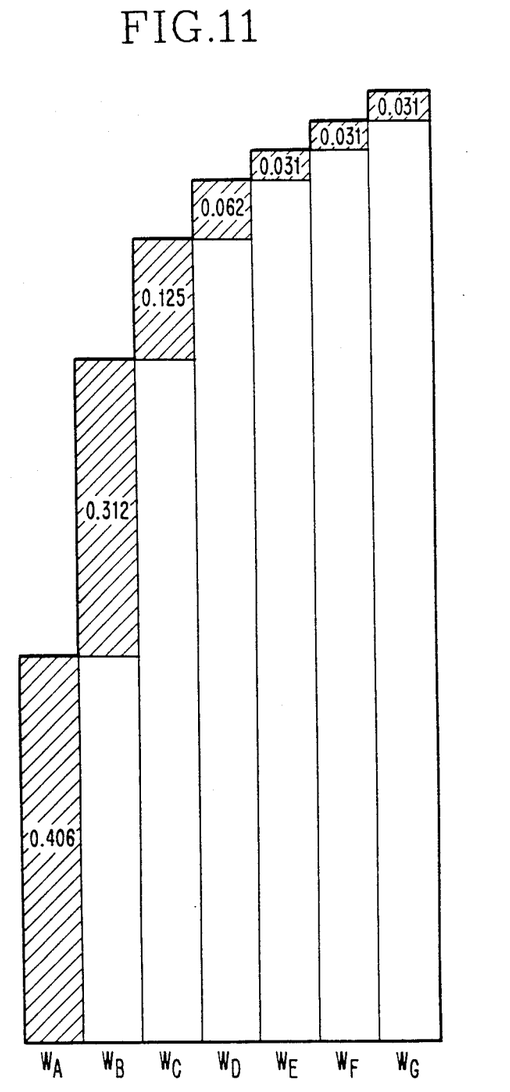
FIG. 11 and FIG. 12 are cumulative graphs, FIG. 11 showing count-based probabilities and FIG. 12 showing discounted probabilities for bi-grams.
Figure 12:
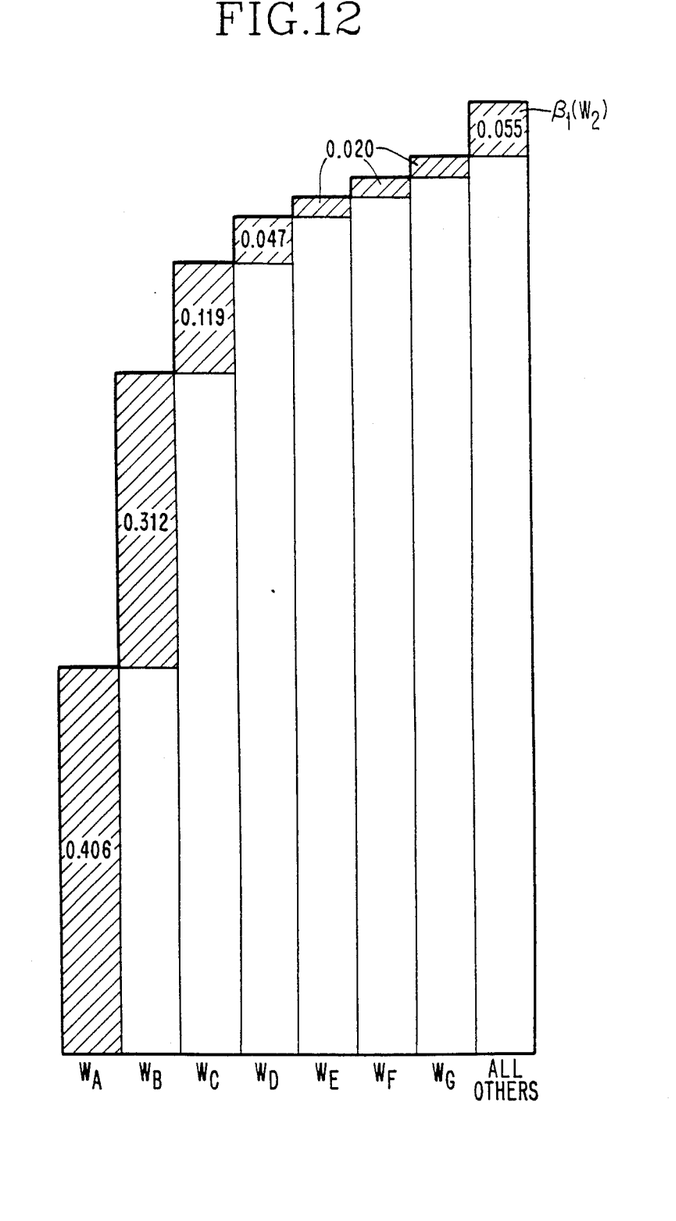

To determine how the 0.104 freed probability mass FM1 is to be distributed among the 4997 non-occurring words, bi-grams are analyzed. In FIG. 10, a table of bi-grams based on a key for $w_2$ is set forth. For each word following $w_2$ in the sample text, a corresponding count is stored. Based on the table in FIG. 6, count-based probabilities are discounted. A freed probability mass FM2 for the bi-gram level is found to be 0.055 for the key for $w_2$. The discounting and the remaining freed probability mass FM2 of 0.055 are shown in FIG. 11 and FIG. 12. In order to determine the actual probabilities for $w_D, w_E, w_F, w_G$ a constant $\alpha_2$ is to be computed:

$$\alpha_2 = \beta_2 \gamma_2 = (.104)\left(\frac{1}{1 - (.406 + .312 + .119)}\right) = (.104)(6.13) = .641.$$

The discounted bi-gram probabilities for $w_D, w_E, w_F, w_G$ (column 4 of FIG. 10) must be multiplied by the value of $\alpha_2$ to arrive at the respective values of conditional probabilites $P(w_D|w_1,w_2)$, $P(w_E|w_1,w_2)$, $P(w_F|w_1,w_2)$, $P(w_G|w_1,w_2)$.

It is noted that the probability of tri-grams is initially observed and a freed probability mass FM1 of 0.104 is generated. With the bi-gram analysis, $(0.055\alpha_2)$ of the 0.104 is allocated to those words unaccounted for by the tri-gram analysis and bi-gram analysis. To determine how much of the $(0.055\alpha_2)$ portion of the probability distribution is to be allocated to a word not proceeded by $w_1, w_2$ or by $w_2$ in the sample text, uni-grams are employed. In that each vocabulary word is presumed, preferably, to occur at least once in the sample text, there be a count-based probability therefor. Accordingly, at some level an m-gram ending with a selected vocabulary word will have a stored probability.

In determining a probability estimate for the selected word being the next word after $w_1, w_2$, the freed probability mass values of higher level analyses must be accounted for. That is, the higher $\tilde{\beta}$'s must be considered.

In addition, "multiple counting" for lesser-included m-grams must be avoided.

That is, bi-grams having the key $w_2$ include two types. The first type represents a bi-gram ending with a word $w_x$ such that the tri-gram $w_1, w_2, w_x$ occurs in the sample text and has counts which are considered in a tri-gram probability distribution. The second type refers to bi-grams which end with a word $w_y$ such that the tri-gram $w_1, w_2, w_y$ does not occur in the sample text and does not have counts considered in the tri-gram distribution. Only counts corresponding to bi-grams of the second type are considered in the bi-gram distribution for $w_2$. Only counts of the second type are used to re-distribute the freed probability mass of the tri-gram distribution having the key $w_1, w_2$.

In this way, the counts for the key $w_2$ are adjusted to account for multiple counting in lesser-included m-grams. The avoidance of "multiple counting" is accounted for by a factor $\gamma$ which is described in greater detail in section B hereinbelow.

Taken together, the $\tilde{\beta}$ and $\gamma$ for a key are entered into the expression, $\alpha$, where $\alpha = \tilde{\beta}\gamma$ is referred to as a normalization constant.

A detailed description of determining discount factors and $\alpha$ values is set forth in section B hereinbelow for a specific embodiment of the invention.

It is noted that alternative techniques to that described in section B may be employed in generating the discount factors. Moreover, although the specific embodiment starts with tri-grams, the present invention contemplates starting with m-grams of length greater than three and "backing off" from there. That is, m-grams of a longest length j are analyzed first and, if necessary, analysis based on shorter m-grams is performed and, if necessary, analysis based on still shorter m-grams is performed thereafter, and so on. Although it is preferred that successive analyses decrement by a single event, this is not a requirement.

A speech recognition embodiment of the present invention has been implemented in the PL1 language for use on an IBM VM/CMS system, and may be implemented on other computers in other languages as well.

In addition to the speech recognition environment, the present invention is applicable to other environments as well. For example, the invention may be employed in an optical character recognition environment, in a handwriting recognition environment, or in a data compression environment, where the events may correspond to characters and/or words. With regard to the two former applications, image recognition would be analogous to the acoustic match component in a speech recognition system. With regard to the data compression application, the language model would assign probabilities of a specific character or word being next; from this information a code of an appropriate length is assigned according to known methods.

B. Theory for a Specific Embodiment Based on Modified Turing's Estimate

As discussed hereinabove, the present invention addresses the problem of estimating probabilities from sparse data by reducing apparently unreliable probability estimates derived from observed counts and distributing the "freed probability mass" among m-grams which never occured in the sample text. The reduction is achieved, in a preferred specific embodiment, by replacing maximum likelihood estimates for m-grams having low counts with re-normalized Turing's estimates. The re-distribution is performed with the recursive utilization of lower-level conditional distributions. The theory of this process is now described.

Let N be a sample text size and let $n_r$ be the number of m-grams which occurred in the text exactly r times, so that $$N = \sum_r r n_r \qquad (1)$$

Turing's estimate $P_T$ for a probability of a word (m-gram) which occurred in the sample r times is $$P_T = \frac{r^*}{N} \qquad (2)$$

where $$r^* = (r+1)\frac{n_{r+1}}{n_r}. \qquad (3)$$

A procedure for replacing a count r with a modified "discount" count $r'$ is called "discounting". The ratio $r'/r$ represents a discount coefficient, or discount factor, $d_r$. When $r' = r^*$ the result is Turing's discounting.

The m-gram $w_1 \ldots, w_m$ is denoted as $w_1^m$ and the number of times it occurred in the sample text is denoted as $c(w_1^m)$. Then the maximum likelihood probability is $$P_{ML} = \frac{c(w_1^m)}{N} \qquad (4)$$

and the Turing's estimate is $$P_T = \frac{c^*(w_1^m)}{N} \qquad (5)$$

where $$c^*(x) = (c(x) + 1)\frac{n_{c(x)+1}}{n_{c(x)}}. \qquad (6)$$

It follows from (1)–(3) that the total probability estimate, using (5), for the set of words (m-grams) that actually occurred in the sample is $$\sum_{w_1^m: c(w_1^m) > 0} P_T(w_1^m) = 1 - \frac{n_1}{N}. \qquad (7)$$

This, in turn, leads to the estimate for the probability of observing some previously unseen m-gram as a fraction $n_1/N$ of "singletons" (i.e., m-grams occurring only once) in the sample text:

$$\sum_{w_1^m: c(w_1^m) = 0} P_T(w_1^m) = \frac{n_1}{N}. \qquad (8)$$

On the other hand, $$\sum_{w_1^m: c(w_1^m) > 0} [P_{ML}(w_1^m) - P_T(w_1^m)] = \qquad (9)$$

$$\sum_{w_1^m: c(w_1^m) > 0} \delta_{c(w_1^m)} = \sum_{r > 0} n_r(1 - d_r)\frac{r}{N} = \frac{n_1}{N}$$

-continued where $$\delta_c = \frac{c}{N} - \frac{c^*}{N} = (1 - d_c)\frac{c}{N}. \quad (10)$$

Thus $$\sum_{w_1^m: c(w_1^m) > 0} \delta_{c(w_1^m)} = \sum_{w_1^m: c(w_1^m) = 0} P_T(w_1^m). \quad (11)$$

The present method is based on the interpretation of $\delta_c$ in (11) as a "contribution" of an m-gram $w_1^m$ with a count $c(w_1^m)$ to the probability of "unseen" m-grams. Moreover, assuming that the m−1-gram $w_1^{m-1}$ has been observed in the sample text, an entity $\delta_c^{(cond)}$ is introduced which is analogous to $\delta_c$, defined by Equation (10):

$$\delta_{c(w_1^m)}^{(cond)} = (1 - d_{c(w_1^m)}) \frac{c(w_1^m)}{c(w_1^{m-1})}. \quad (12)$$

The estimator $P_s(w_m | w_1^{m-1})$ is defined inductively as follows. It is assumed that the lower-level conditional estimator $P_s(w_m | w_2^{m-1})$ has been defined. Then, when $c(w_1^{m-1}) > 0$, $$p_s(w_m | w_1^{m-1}) = \tilde{P}(w_m | w_1^{m-1}) = d_{c(w_1^m)} \frac{c(w_1^m)}{c(w_1^{m-1})} \quad (13)$$

gives the conditional probability estimate for words $w_m$ observed in the sample text after $w_1^{m-1}$ ($c(w_1^m) > 0$). It is convenient to define a function $\tilde{\beta}$ by $$\tilde{\beta}(w_1^{m-1}) = \quad (14)$$

$$\sum_{w_m: c(w_1^m) > 0} \delta_{c(w_1^m)}^{(cond)} = 1 - \sum_{w_m: c(w_1^m) > 0} \tilde{P}(w_m | w_1^{m-1}).$$

This gives an estimate of the sum of conditional probabilities of all words $w_m$ which never followed $w_1^{m-1}$ ($c(w_1^m) = 0$). This "freed probability mass" $\tilde{\beta}$, defined by Equation (14), is distributed among $w_m$ for which $c(w_1^m) = 0$ using a previously defined (by induction) lower-level conditional distribution $P_s(w_m | w_2^{m-1})$:

$$P_s(w_m | w_1^{m-1}) = \alpha P_s(w_m | w_2^{m-1}), \quad (15)$$

where $\alpha$ is a normalizing constant defined by the following expressions:

$$\alpha = \alpha(w_1^{m-1}) = \tilde{\beta}(w_1^{m-1})\gamma(w_1^{m-1}) \quad (16)$$

$$\gamma(w_1^{m-1}) = \frac{1}{\sum_{w_m: c(w_1^m) = 0} \tilde{P}_s(w_m | w_2^{m-1})} = \frac{1}{1 - \sum_{w_m: c(w_1^m) > 0} P(w_m | w_2^{m-1})}. \quad (17)$$

When $c(w_1^{m-1}) = 0$, $$P_s(w_m | w_1^{m-1}) = P_s(w_m | w_2^{m-1}). \quad (18)$$

Complementing $\tilde{P}$ and $\tilde{\beta}$ definitions, given by (13) and (14), for the case when $c(w_1^{m-1}) = 0$, with $$\tilde{P}(w_m | w_1^{m-1}) = 0$$

and $$\tilde{\beta}(w_1^{m-1}) = 1,$$

estimates (13), (15) and (18) are combined in the following recursive expression for the conditional probability distribution:

$$P_s(w_m | w_1^{m-1}) = \tilde{P}(w_m | w_1^{m-1}) + \theta(\tilde{P}(w_m | w_1^{m-1})) \cdot \alpha(w_1^{m-1}) P_s(w_m | w_2^{m-1}) \quad (19)$$

where $$\theta(x) = \begin{cases} 1, & \text{if } x = 0 \\ 0, & \text{otherwise.} \end{cases} \quad (20)$$

A modified version of the distribution given by (19) is now described with the estimate $n_1/N$ for the probability of all unseen m-grams left intact and with relatively high values of counts, $c > k$, being considered reliable and not subject to discounting. That is, $$d_r = 1, \text{ for } r > k. \quad (21)$$

Turing's original discount coefficients d, for $r \leq k$ are then adjusted so that the equation expressing the balance between the "contributions" and the probability of unseen m-grams $$\sum_{w_m: c(w_1^m) > 0} \delta_{c(w_1^m)} = \sum_{1 \leq r \leq k} n_r(1 - d_r)\frac{r}{N} = \frac{n_1}{N} \quad (22)$$

is satisfied. Equation (22) is analogous to Equation (9). An adjustment of the $d_r$ is characterized in the form:

$$(1 - d_r) = K\left(1 - \frac{r^*}{r}\right) \quad (23)$$

where K is a constant. The unique solution therefor is given by $$d_r = \frac{\frac{r^*}{r} - \frac{(k+1)n_{k+1}}{n_1}}{1 - \frac{(k+1)n_{k+1}}{n_1}}, \text{ for } 1 \leq r \leq k. \quad (24)$$

Equality (23) is equivalent to the requirement that newly defined count "contributions"

$$\left(\frac{r}{N} - \frac{r'}{N}\right)$$

are proportional to the Turing's "contributions"

$$\left(\frac{r}{N} - \frac{r^*}{N}\right).$$

As for the value for the parameter k, in practice k=5 has been found to be a good choice. Other ways of computing discount coefficients could be suggested, for, in general, the model is not very sensitive to the actual values of $d_r$. This condition holds as long as an estimate for the probability of observing some previously unseen m-gram is reasonable. When data is very sparse, an estimate $n_1/N$ is well justified—there isn't too much of a difference in seeing an m-gram once or not seeing it at all.

Numerical values for $\alpha$'s can be pre-computed which provides computational efficiency. Experiments show that setting $d_1=0$, which is equivalent to discarding all "singletons", does not affect the model performance, and thus provides substantial savings in storage space used by the Language Model. In this regard, while no discount probability is stored for an m-gram occurring only once in the sample text, the singleton occurrence contributes to the freed probability mass for the key corresponding to such m-gram. Moreover, although not performed, m-grams with higher counts (less than some threshold T) may be treated similarly.

I claim:

1. In a speech recognition system, a computer-implemented method of evaluating the likelihood of a word from a vocabulary of words occurring next after a string of known words, based on counts of word sequences occurring in a sample text which is sparse relative to possible word sequences, the method comprising the steps of:
   (a) characterizing word sequences as m-grams, each m-gram occurring in the sample text representing a key of words followed by a word;
   (b) storring a discounted probability $\tilde{P}$ for each of at least some m-grams occurring in the sample text;
   (c) generating a freed probability mass value $\tilde{\beta}_L$ for each key occurring in the sample text, the $\tilde{\beta}_L$ for a key of length L being allocated to those m-grams which (i) include the subject key and (ii) have no respective discounted probabilites stored therefor;
   (d) generating $\gamma_L$ factors, each $\gamma_L$ factor being valued to normalize the probability distribution of only those m-grams which (i) are formed from a key of length L and (ii) are not included in a greater-included m-gram having a key of known words;
   (e) storing for each key of length L, a value $\alpha_L = \tilde{\beta}_L \gamma L$ and
   (f) evaluating a likelihood of a selected word following a string of known words including the steps of:
      (i) searching successively shorter keys of the known words until a key is found which, when followed by the at least one selected word, represents an m-gram having a discounted probability $\tilde{P}$; stored therefor, and retrieving $\tilde{P}$;
      (ii) retrieving the stored $\alpha_L$ value for each longer key searched before the stored m-gram is found; and
      (iii) computing a likelihood value of the selected word following the string of known words based on the retrieved $\alpha_L$ values and the retrieved $\tilde{P}$ value.

2. The method of claim 1 comprising the further step of, prior to storing the discounted probability $\tilde{P}$:
   forming the discounted probability $\tilde{P}$ for an m-gram, which includes the steps of:
      (i) assigning a count-based probability to each m-gram occurring in the sample data based on a frequency of occurrence; and
      (ii) applying modified Turing's estimate to each of at least some of the assigned probabilities to generate a respective discounted probability therefor.

3. In a speech recognition system, apparatus for estimating probability distributions of word sequences of length j from sparse sample data in which only some of the possible word sequences of length j occur in the sample text, the apparatus comprising:
   (a) means for storing discounted probabilities, where each discounted probability replaces a count-based probability for an m-gram of less than or equal to j words in a sequence;
   (b) means for storing a normalization constant $\alpha$ for each of at least some keys occurring in the sample text, wherein a key represents a sequence of less than j words and wherein the normalization constant for a key is based on (i) a freed probability mass which represents the difference from one of the sum of discounted probabilities of m-grams formed of the key and a subsequent word and (ii) a factor which avoids multiple counting among m-grams; and
   (c) processing means, having a sequence of known words and a selected word as input, for evaluating the likelihood of the word sequence including the selected word following (j−1) known words, said processing means including:
      means for retrieving a discounted probability for the longest m-gram that has a discounted probability stored therefor and that includes a key of (j−k) known words (where k is a positive integer less than j) followed by the selected word;
      means for retrieving the normalization constant for each key of length greater than (j−k) which includes the known words; and
      means for multiplying the retrieved normalization constants and the retrieved discounted probability;
      the product of the multiplying means indicating the likelihood of the word sequence indicating the selected word followed by the (j−1) known words.

4. The apparatus of claim 3 further comprising:
   means for choosing selected words from a vocabulary of words and evaluating a respective likelihood for each chosen word.

5. In a symbol recognition system, a computer-implemented method of evaluating the likelihood of a symbol from a vacabulary of symbols occurring next after a string of known symbols, based on counts of symbol sequences occurring in a sample text which is sparse relative to possible symbol sequences, the method comprising the steps of:
   (a) characterizing symbol sequences as m-grams, each m-gram occurring in the sample text representing a key of symbols followed by a symbol;
   (b) storing a discounted probability $\tilde{P}$ for each of at least some m-grams occurring in the sample text;
   (c) generating a freed probability mass value $\tilde{\beta}_L$ for each key occurring in the sample text, the $\tilde{\beta}_L$ for a key of length L being allocated to those m-grams which (i) include the key and (ii) have no respective discounted probabilities stored therefor;
   (d) generating $\gamma_L$ factors, each $\gamma_L$ factor being valued to normalize the probability distribution of only those m-grams which (i) are formed from a key of length L and (ii) are not included in a greater-included m-gram having a key of known symbols;

(e) storing for each key of length L, a value $\alpha_L = \tilde{\beta}_L \gamma_L$ and (f) evaluating a likelihood of a selected symbol following a string of known symbols including the steps of:

(i) searching successively shorter kyes of the known symbols until a key is found which, when followed by the at least one selected symbol, represents an m-gram having a discounted probability $\tilde{P}$ stored therefor, and retrieving $\tilde{P}$;

(ii) retrieving the stored $\alpha_L$ value for each longer key searched before the stored m-gram is found; and   (iii) comprising a likelihood value of the selected symbol following the string of known symbols based on the retrieved $\alpha_L$ values and the retrieved $\tilde{P}$ value.

6. The method of claim 5 comprising the further step of, prior to storing the discounted probability $\tilde{P}$:

forming the discounted probability $\tilde{P}$ for an m-gram., which includes the steps of: (i) assigning a count-based probability to each m-gram occurring in the ssample data based on frequency of occurrence; and   (ii) applying modified Turing;3 s estimate to each of at least some of the assigned probabilities to generate a respective discounted probability therefor.

7. A method as claimed in claim 5, characterized in that the symbols are optical symbols.

8. A method as claimed in claim 5, characterized in that the symbols are characters.

9. A method as claimed in claim 5, characterized in that the symbols are words.

10. In a speech recognition system, apparatus for estimating probability distributions of symbol sequences of length j from sparse sample data in which only some of the possible symbol sequences of length j occur in the sample text, the apparatus comprising:

(a) means for storing discounted probabilities, wherein each discounted probability replaces a count-based probability for an m-gram of less than or equal to j symbols in a sequence;

(b) means for storing a normalization constant $\alpha$ for each of at least some keys occurring in the sample text, wherein a key represents a sequence of less than j symbols and wherein the normalization constant of a key is based on (i) a freed probability mass which represents the difference from one of the sum of discounted probabilities of m-grams formed of the key and a subsequent symbol and (ii) a factor which avoids multiple counting among m-grams; and (c) processing means, having a sequence of known symbols and a selected symbol as input, for evaluating the likelihood of the symbol sequence including the selected symbol following (j−1) known symbols, said processing means including:

means for retrieving a discounted probability for the longest m-gram that has a disconnected probability stored theefor and that includes a key of (j−k) known symbols (where k is a positive integer less than j) followed by the selected symbol;

means for retrieving the normalization constant for each key of length greater than (j−k) which includes the known symbols, and means for multiplying the retrieved normalization constants and the retrieved discounted probability;

the product of the multiplying means indicating the likelihood of the symbol sequence including the selected symbol followed by the (j−1) known symbols.

11. The apparatus of claim 10 further comprising:

means for choosing selected symbols from a vocabulary of symbols and evaluating a respective likelihood for each chosen symbol.

12. An apparatus as claimed in claim 10, characterized in that the symbols are optical symbols.

13. An apparatus as claimed in claim 12, characterized in that the symbols are characters.

14. An apparatus as claimed in claim 12, characterized in that the symbols are words.

* * * * *

UNITED STATES PATENT AND TRADEMARK OFFICE
CERTIFICATE OF CORRECTION

PATENT NO. : 4,831,550

DATED : May 16, 1989

INVENTOR(S) : Slava M. Katz

It is certified that error appears in the above-identified patent and that said Letters Patent is hereby corrected as shown below:

Claim 5, line 36 (column 15, line 16), "comprising" should read --computing--;

Signed and Sealed this

Ninth Day of January, 1990

Attest:

JEFFREY M. SAMUELS

*Attesting Officer*  *Acting Commissioner of Patents and Trademarks*